US011597456B2

United States Patent
Maurer et al.

(10) Patent No.: US 11,597,456 B2
(45) Date of Patent: Mar. 7, 2023

(54) CROSS-LINK FOR TRACKS OF SNOW GROOMERS

(71) Applicant: PRINOTH S.P.A., Vipiteno (IT)

(72) Inventors: Gregor Maurer, Vipiteno (IT); Martin Kirchmair, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 741 days.

(21) Appl. No.: 16/432,447

(22) Filed: Jun. 5, 2019

(65) Prior Publication Data
US 2019/0375472 A1 Dec. 12, 2019

(30) Foreign Application Priority Data
Jun. 6, 2018 (IT) .................. 102018000006088

(51) Int. Cl.
*B62D 55/28* (2006.01)
*B62D 55/06* (2006.01)
*E01H 4/02* (2006.01)
*B62D 55/18* (2006.01)

(52) U.S. Cl.
CPC .......... *B62D 55/286* (2013.01); *B62D 55/06* (2013.01); *B62D 55/18* (2013.01); *E01H 4/02* (2013.01)

(58) Field of Classification Search
CPC ........ B62D 55/28; B62D 55/26; B62D 55/18; B62D 55/08; B62D 55/00; B62D 55/0887; B62D 55/244; B62D 55/286; B62D 55/06; B62D 55/253; E01H 4/02
See application file for complete search history.

(56) References Cited

U.S. PATENT DOCUMENTS

2010/0225160 A1* 9/2010 Rainer ................ B62D 55/286
   305/191
2016/0257358 A1* 9/2016 Johnson ................ B62D 55/28

FOREIGN PATENT DOCUMENTS

| CH | 517 618 | 1/1972 |
| WO | WO 2008/057911 | 5/2008 |
| WO | WO 2009/134168 | 11/2009 |
| WO | WO 2018/060884 | 4/2018 |

OTHER PUBLICATIONS

Isabel Duarte and Monica Oliveira, Aluminum Alloy Foams: Production and Properties, Mar. 9, 2012, Powder Metallurgy, Dr. Katsuyoshi Kondoh (Ed.) (Year: 2012).*
Italian Search Report for Italian Application No. IT 2018000006088 dated Feb. 1, 2019.

* cited by examiner

*Primary Examiner* — Jacob B Meyer
*Assistant Examiner* — Abigail R Hymel
(74) *Attorney, Agent, or Firm* — Neal, Gerber & Eisenberg LLP

(57) ABSTRACT

A cross-link for tracks of snow groomers, the cross-link comprising a section bar, which has an elongated shape, extends in a first direction, is limited by an outer surface and comprises a portion for fixing to at least one belt of a track of a snow groomer, and it is provided with an inner cavity, which extends through the section bar in the first direction, and is open at the side in the first direction; wherein the inner cavity is filled, at least in part, with a filling material comprising metal foam, and in certain embodiments, the inner cavity is completely filled with the filling material.

13 Claims, 4 Drawing Sheets

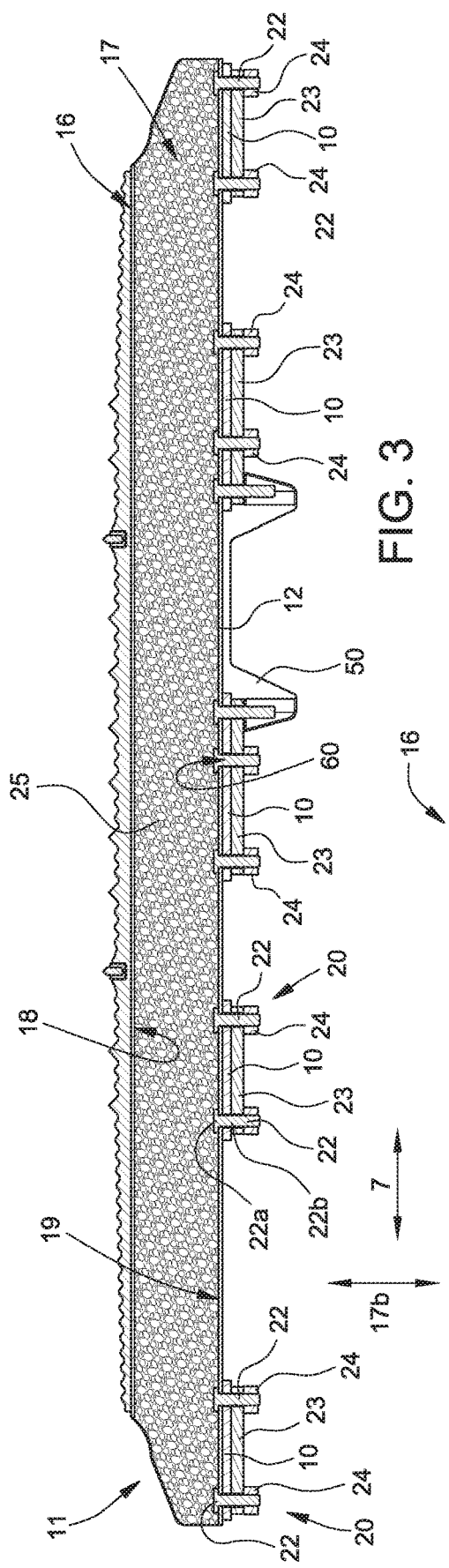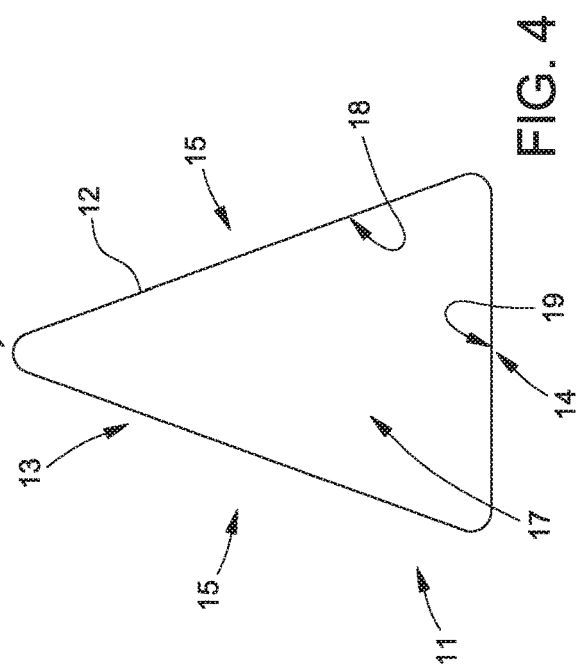

CROSS-LINK FOR TRACKS OF SNOW GROOMERS

PRIORITY CLAIM

This application claims the benefit of and priority to Italian Patent Application No. 102018000006088, filed on Jun. 6, 2018, the entire contents of which are incorporated by reference herein.

TECHNICAL FIELD

The present disclosure relates to a cross-link for tracks of snow groomers.

BACKGROUND

In the sector of preparing ski slopes, the manufacturing of a snow groomer is known comprising a support frame; a driver's cabin mounted centrally onto the support frame; and two tracks mounted on opposite sides of the support frame.

Each track comprises a train of wheels mounted rotatably to the support frame; a plurality of belts wound in a circle about the wheels; and a plurality of cross-links fixed to the belts transversely to an advancing direction of the track and configured to enable the grip of the track on the blanket of snow on the ski slope.

Each cross-link comprises a section bar, which is normally made of steel, aluminium or aluminium alloy, it has a contoured shape, and is limited by a substantially triangular-shaped outer surface.

The outer surface comprises a substantially flat fixing portion arranged in contact with a number of belts depending on the length of the cross-link, and two lateral sides protruding from the fixing portion and mutually converging.

The cross-link also has an inner cavity, which extends through the section bar transversely to the advancing direction of the track, and it is open laterally at the free ends thereof or transversely to one side of the cross-link.

Generally, the cross-link is fixed to the relative belts by a fixing device comprising an inner plate inserted in the inner cavity and an outer plate arranged in contact with the belts on the opposite side of the section bar.

The assembly defined by the outer plate, by the belts, by the cross-link, and by the inner plate is blocked perpendicularly to the belts by a plurality of fastening screws mounted through the outer plate, the belts, and the cross-link and screwed in the inner plate.

The snow groomer is further equipped with a plurality of operating units, such as, for example, a cutter for working the blanket of snow on the ski slopes, a blade for moving piles of snow along the ski slopes, and/or a hoist assembly for guaranteeing the stability of the snow groomer on relatively steep slopes and preventing the sliding of the snow groomer in the event of a loss of grip with the blanket of snow.

Certain known cross-links for tracks of snow groomers of the type described have some drawbacks mainly deriving from the fact that such cross-links have a relatively high number of components and are, consequently, relatively complex and costly. Furthermore, it has been proven that in normal use of snow groomers, water, also in the form of ice or snow, enters the inner cavity of the cross-link.

SUMMARY

It is an object of the present disclosure to manufacture a cross-link for tracks of snow groomers, which reduces the drawbacks described above and which is relatively simple and relatively inexpensive to operate.

According to the present disclosure is provided a cross-link for tracks of snow groomers, the cross-link comprising a section bar, which has an elongated shape, extends in a first direction, is limited by an outer surface, comprises a portion to be fixed to at least one belt of a track of a snow groomer, and it is provided with an inner cavity, which extends through the section bar in the first direction, and is laterally open in the first direction; wherein the inner cavity is filled, at least in part, with a filling material comprising metal foam, and in certain embodiments, the inner cavity is completely filled with the filling material.

It should thus be appreciated that the cross-link is composed of a relatively smaller number of pieces and, consequently, it is relatively simpler and relatively cheaper to produce. Furthermore, the cross-link, thus configured, prevents water, also in the form of ice or snow, from accumulating in the cross-link.

According to one embodiment, the filling material is aluminium metal foam.

According to another embodiment, the fixing portion is fixed to the belt by a fixing device comprising a fixer fitted in the inner cavity; the fixing material locking the fixer inside the inner cavity in the first direction and/or in a second direction perpendicular to the fixing portion.

According to another embodiment, the fixing device comprises at least one outer plate fitted on the opposite side of the section bar with respect to the belt; at least one fastening screw, which extends through the section bar, the belt and the outer plate; and, for each fastening screw, a respective fastening nut screwed to the fastening screw.

According to another embodiment, the filling material fills the inner cavity, at least partially, so as to block the screws or nuts inside the cavity and increase the relative stiffness of the cross-link.

According to another embodiment, the filling material completely fills the inner cavity, so as to block the screws or nuts inside the cavity and increase the relative stiffness of the cross-link.

It is another object of the present disclosure to manufacture a track, which reduces certain of the drawbacks of certain of the prior art.

According to the present disclosure is provided a track for a snow groomer comprising at least one cross-link as disclosed herein and at least one belt (and in certain embodiments a plurality of belts), coupled to the cross-link.

According to another embodiment, the track comprises a plurality of belts parallel to one another and a plurality of cross-links fixed to the belts; each cross-link being manufactured as disclosed herein.

It is a further object of the present disclosure to produce a snow groomer, which reduces certain of the drawbacks of certain of the prior art.

According to the present disclosure is manufactured a snow groomer for the preparation of ski slopes; the snow groomer comprising a support frame; a driver's cabin fitted on the support frame; and two tracks fitted on opposite sides of the support frame; each track comprising a plurality of belts parallel to one another and a plurality of cross-links fixed to the belts; each cross-link being produced as disclosed herein.

It is a further object of the present disclosure to provide a method for manufacturing a cross-link for a track of a snow groomer, which reduces certain of the drawbacks of certain of the prior art.

According to the present disclosure is provided a method for manufacturing a cross-link for tracks of a snow groomer; the method comprises the steps of: manufacturing a hollow section bar; making holes at fixing points for a fixer; arranging the fixer inside the cavity of the section bar at respective holes; injecting the metal foam filling material inside the cavity, so as to fix the fixer; (in certain embodiments before injecting the metal foam filling material), temporarily fixing the fixer at the holes by the temporary fixer, to hold the fixer in place during the step of injecting the metal foam filling material.

Additional features are described in, and will be apparent from the following Detailed Description and the figures.

BRIEF DESCRIPTION OF THE DRAWINGS

The disclosure will now be described with reference to the appended drawings, showing a non-limiting embodiment thereof, wherein:

FIG. 3 is a sectional view along plane of FIG. 2, with parts removed for clarity, of a detail of a first embodiment of the track of FIG. 2;

FIG. 4 is a sectional view along plane IV-IV perpendicular to plane III-III, with parts removed for clarity, of a first embodiment of the track of FIG. 2.

DETAILED DESCRIPTION

Figure 1:
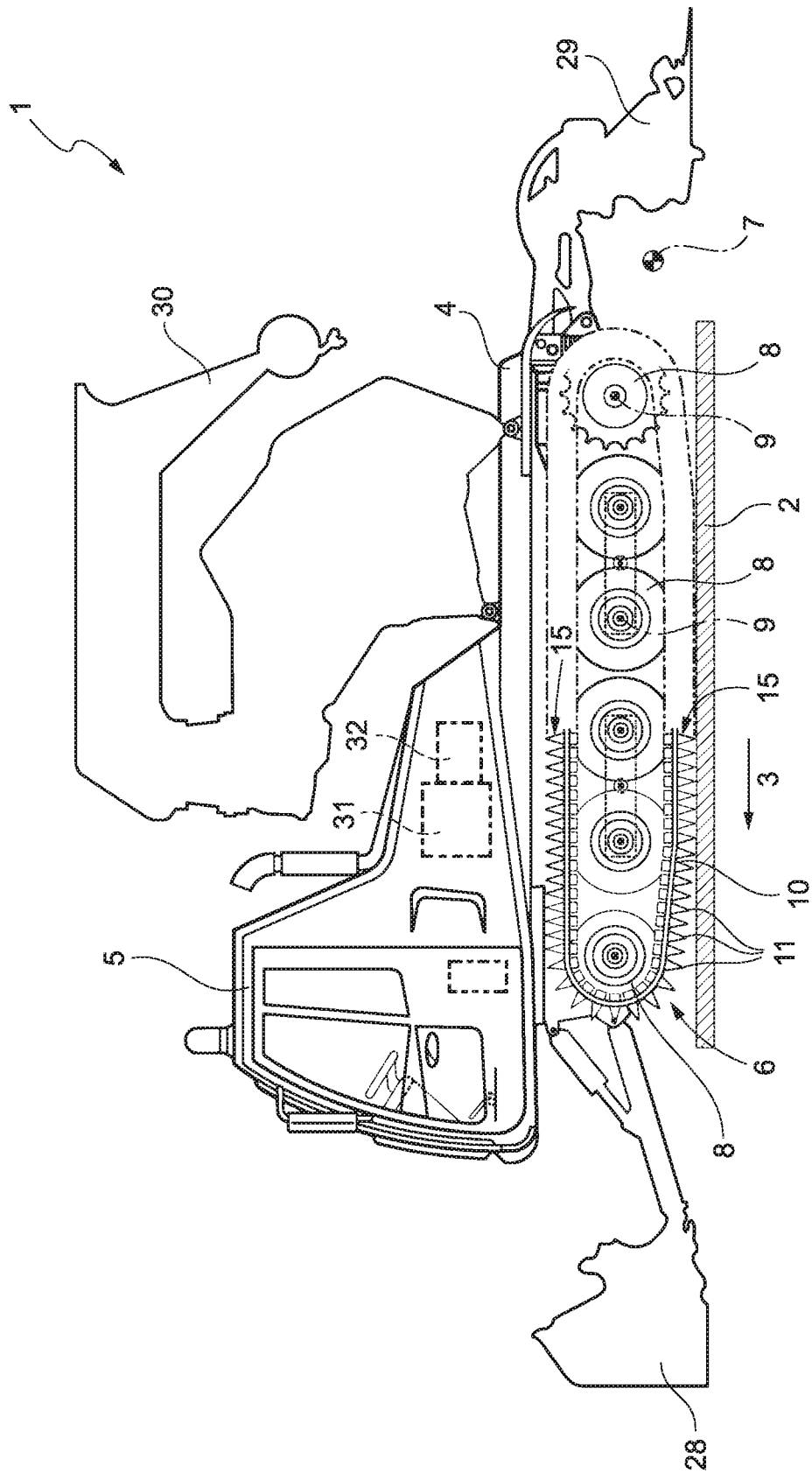
FIG. 1 is a schematic side view, with parts removed for clarity, of one embodiment of a snow groomer comprising at least one track made according to one embodiment of the present disclosure.
Figure 2:
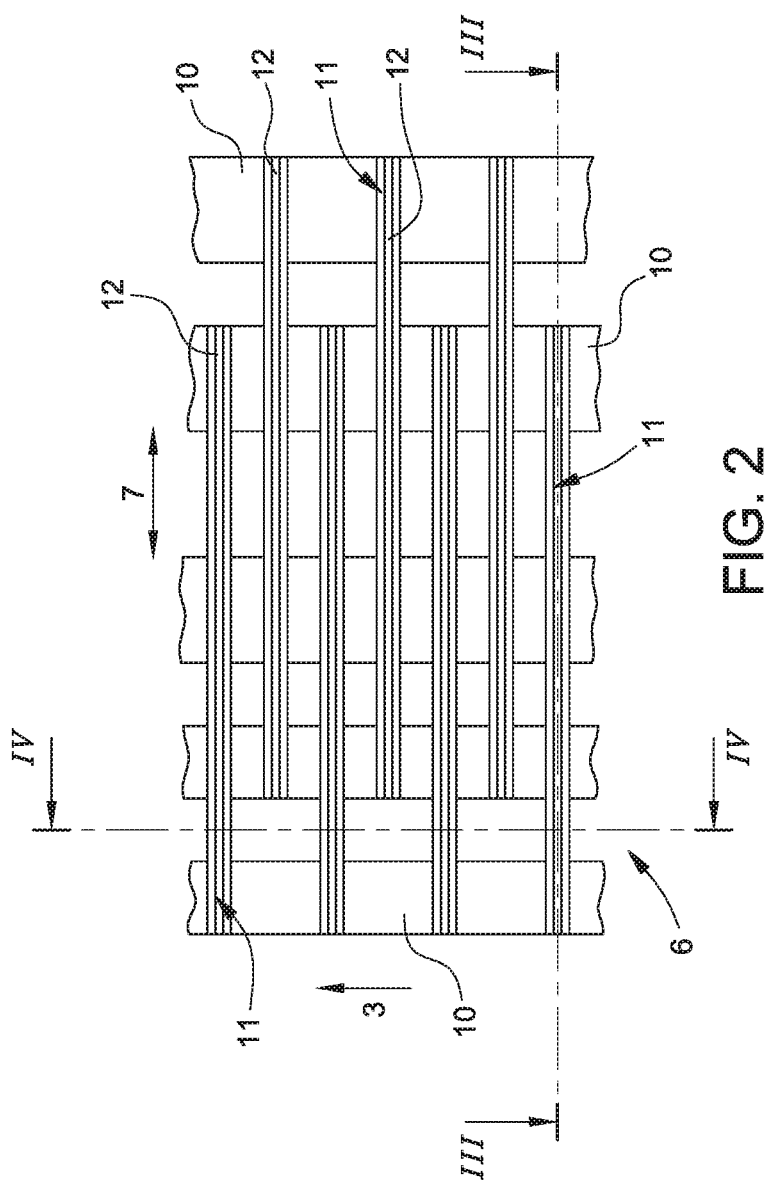
FIG. 2 is a schematic plan view, with parts removed for clarity, of the track of the snow groomer of FIG. 1.

With reference to FIGS. 1 and 2, a snow groomer configured to prepare ski slopes 2 is globally indicated with 1.

The snow groomer 1 is motorised to advance along a slope 2 in an advancing direction 3, and comprises a support frame 4, a driver's cabin 5 mounted centrally onto the frame 4, and two tracks 6 (only one of which is shown in FIG. 1) mounted on opposite sides of the frame 4 in a direction 7 transversal to the direction 3 and perpendicular to the plane of the sheet in FIG. 1.

Each track 6 comprises a train of wheels 8 mounted onto the frame 4 to rotate about respective rotation axes 9 parallel to the direction 7, and a plurality of belts 10, which are movable in respective vertical containment planes, parallel to one another and perpendicular to the direction 7.

Each belt 10 is wound in a circle about the front wheel 8 and the rear wheel 8, and has a lower branch, which is kept in contact with the slope 2 by the intermediate wheels 8.

The track 6 further comprises a plurality of cross-links 11, which are fixed to the relative belts 10 parallel to the direction 7, and are configured to enable the grip of the track 6 on the blanket of snow on the ski slope 2.

With reference to FIGS. 2, 3 and 4, each cross-link 11 comprises a section bar, which is in certain embodiments, but not necessarily made of steel, aluminium or aluminium alloy, has a contoured shape, and is limited by a substantially triangular-shaped outer surface (FIGS. 1 and 4).

The surface 13 comprises a substantially flat fixing portion 14 arranged in contact with a number of belts 10 depending on the length of the cross-link 11, and two lateral sides 15, which protrude from the portion 14, mutually converging, and connected to one another at an end portion 16 of the section bar 12 opposite the portion 14.

Each section bar 12 of each cross-link 11 also has an inner cavity 17, which extends through the section bar 12 in the direction 7, and it is open at the side in the direction 7.

The cavity 17 is limited by an inner surface 18 comprising a substantially flat coupling portion 19 parallel to and opposite the portion 14 of the surface 13.

The cavity 17 is filled, at least in part, with a filling material 25 comprising metal foam. Such metal foam is, in certain embodiments, an aluminum metal foam. In other words, the metal of the metal foam is, in certain embodiments, aluminum.

The cross-link 11 is fixed to the relative belts 10 by a fixing device 20 comprising a plurality of fastening screws 22, which are blocked and held still by the filling material inside the cavity 17, and extend through the section bar 12 and the relative belt 10.

The screws 22 also extend through an outer plate 23, which is arranged in contact with the relative belt 10 on the opposite side of the section bar 12, and is blocked against the belt 10 by a plurality of fastening nuts 24, each screwed onto a relative screw 22.

With regard to the above, it is worth pointing out that each screw 22 has a head 22a arranged inside the cavity 17 and a stem 22b, which extends through the section bar 12, the relative belt 10, and the relative plate 23, protruding from the relative plate 23, to be screwed to the relative nut 24.

Furthermore, the track comprises a shoe 50 for each cross-link 11 and is coupled to the respective cross-link 11 to offer a seat for coupling to the wheels 8. Each shoe 50 is fixed to the respective cross-link by fastening screws 22.

Figure 5:
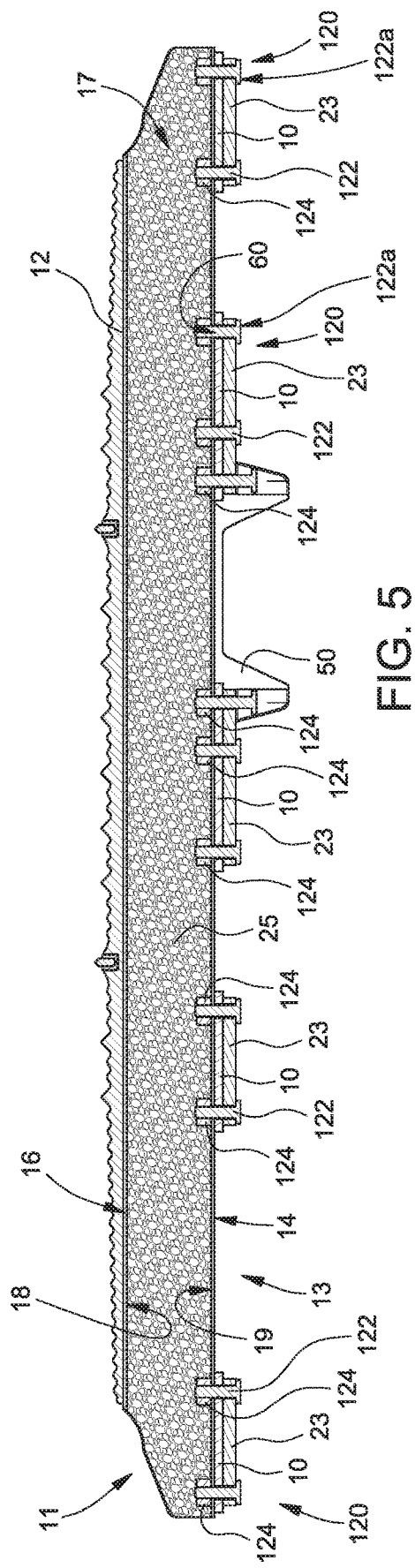
FIG. 5 is a sectional view along plane III-III in FIG. 2, and with parts removed for clarity, of a detail of a second embodiment of the track of FIG. 2.

In an alternative embodiment shown in FIG. 5, nuts 124 are placed inside the cavity 17 instead of screws 22. The nuts 124 are blocked inside the cavity 17 by the filling material 25, in particular the metal foam. The section bar 12 is perforated at the nuts 124 so as to be crossed by a respective screw 122, which is coupled to the respective nut 124. In this embodiment, the cross-link 11 is fixed to the relative belts 10 by a fixing device 120 comprising a plurality of fastening nuts 124, which are blocked and held still by the filling material inside the cavity 17, and extend through the section bar 12 and the relative belt 10. In particular, the filling material 25 keeps the nuts 124 blocked, so that they do not rotate when the screws 122 are screwed to said nuts 124 from outside the cross-link 11.

The nuts 124 are housed inside the cavity 17 and the section bar is provided with holes 60 at the nuts 124, so that screws 122 can be inserted into said nuts 124. In particular, the fixing device 120 comprises fastening screws 122, which extend through an outer plate 23, which is arranged in contact with the relative belt 10 on the opposite side of the section bar 12, and is blocked against the belt 10 by a plurality of fastening screws 122, each screwed onto a relative nut 124.

With regard to the above, it is worth pointing out that each screw 122 has a head 122a arranged in contact with the plate 23 on the opposite side of the belt with respect to the cross-link 11, and the screw 122 extends through the relative plate 23, the relative belt 10, and in the section bar to be screwed to the relative nut 24.

The metal foam filling material 25 makes the cross-link 11 stiffer without excessively increasing the weight. In other words, given the same stiffness the cross-link 11 is lighter than the prior art or given the same weight the cross-link 11 is stiffer than the prior art.

Furthermore, the cross-link 11 is formed by fewer pieces with respect to the prior art because the metal foam 25 has the function of blocking and keeping the screws 22 or nuts 124 in place without the aid of other mechanical pieces, for example plates arranged inside the section bar, as in the prior art.

Moreover, a further advantage is that the filling material 25 prevents snow and ice from penetrating the cavity 17, thus enabling the weight exerted by the cross-links 11 on the belts 10 to be reduced, consequently enabling relatively improved performance of the snow groomer 1.

A step of manufacturing the cross-link 11 of the present disclosure comprises the following steps: the hollow section bar 12 is manufactured; holes 60 are made at the points in which the screws 22 or nuts 124 will be positioned; the screws 22 for the first embodiment or the nuts 124 for the second embodiment are arranged inside the cavity 17 and at respective holes 60; and the filling material 25 is injected into the cavity 17, so as to fix the screws 22 or nuts 124 in place. In one non-limiting embodiment of the present disclosure, once the screws 22 or nuts 124 have been positioned and before injecting the metal foam 25, the screws 22 and nuts 124 are temporarily fixed in the position thereof by small plates or adhesive material, whose aim is to hold the screws 22 and nuts 124 in place during the step of injecting the filling material 25 (i.e., the metal foam 25), wherein once the metal foam 25 has been injected, the screws 22 and nuts 124 will be held firmly in their positions by the metal foam 25.

In greater detail, the cavity 17 is filled, in part, with the metal foam filling material 25, so as to block the screws 22 or nuts 124 inside the cavity 17 in a direction 17b perpendicular to the portion 19.

Consequently, since the relative fastening screws 22 or nuts 124 are blocked along the cavity 17 in the direction 17b and cannot fall inside the section bar 12, the first assembly of the tracks 6 and the successive replacements of the belts 10 entail relatively quick and relatively simple operations of assembly and/or maintenance.

According to one variation, which is not shown, after positioning the screws or nuts inside the cavity 17, the whole cavity 17 is filled with the material 25, so as to block the screws or nuts inside the cavity 17 also in the direction 7.

Furthermore, the filling material 25 blocks the screws 22 (in the embodiment in FIG. 3) or the nuts 124 (in the embodiment in FIG. 5) inside the cavity 17, so that they do not rotate when the respective nut 124 or the respective screw 122 is screwed, in this way it is possible to have an effective fastening from the outside.

In one embodiment, the screws 22 or the nuts 124 inside the cross-link 11 are blocked in contact with the inner surface of the portion 19 of the cross-link 11.

In another embodiment (which is not shown in the appended figures), the two free ends of the cavity 17 of each cross-link 11 are closed by respective contoured plugs, for example made of plastic material, in this case, the contoured plugs 26 extend inside the cavity 17, and prevent snow and ice from coming into contact with and damaging the filling material 25. Each plug can be blocked along the section bar 12 in the direction 7 by at least one fastening screw. According to one variation (which is not shown), the plugs 26 are eliminated.

The snow groomer 1 is further provided with a blade 28 connected to the front part of the frame 4 and configured to move piles of snow along the slope 2, with a cutter 29 connected to the rear part of the frame 4 and configured to work the blanket of snow on the slope 2, and with a hoist assembly 30 mounted above the frame 4.

The snow groomer 1 further comprises an internal combustion engine 31 connected to at least one of the front and rear wheels 8, to the blade 28, to the cutter 29, and to the hoist assembly 30 by a drive unit 32 of the known type.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A snow groomer track cross-link comprising:
   a section bar which:
      extends in a first direction,
      is delimited by an outer surface,
      comprises a fixing portion configured to be fixed to a belt of a track of a snow groomer,
      has an elongated shape when fixed to the belt of the track of the snow groomer, and
      defines an inner cavity which extends through the section bar in the first direction and is laterally open in the first direction, wherein the inner cavity is at least partially filled with a metal foam filling material, the fixing portion is configured to be fixed to the belt by a fixing device comprising a fastener fitted in the inner cavity, the metal foam filling material locks the fastener from rotating, blocks the fastener from becoming unfitted within the inner cavity and increases a stiffness of the section bar.

2. The snow groomer track cross-link of claim 1, wherein the inner cavity is completely filled with the metal foam filling material.

3. The snow groomer track cross-link of claim 1, wherein the metal foam filling material includes an aluminum metal foam.

4. The snow groomer track cross-link of claim 1, wherein the metal foam filling material locks the fastener inside the inner cavity in at least one of: the first direction, and a second direction which is transverse to the fixing portion.

5. The snow groomer track cross-link of claim 1, wherein the fixing device comprises:
   an outer plate on an opposite side of the section bar relative to the belt;
   at least one fastening screw which extends through the section bar, the belt, and the outer plate; and
   for each fastening screw, a fastening nut screwed onto that fastening screw.

6. The snow groomer track cross-link of claim 1, wherein the fastener is selected from a group consisting of: a fastening screw at least partially fixed in the inner cavity and a fastening nut at least partially fixed in the inner cavity.

7. The snow groomer track cross-link of claim 1, wherein the section bar defines the inner cavity independent of any contoured plugs.

8. A snow groomer track comprising:
   a cross-link including a section bar which has an elongated shape, extends in a first direction, is delimited by an outer surface, comprises a fixing portion and defines an inner cavity which extends through the section bar in the first direction and is laterally open in the first direction, wherein the inner cavity is at least partially filled with a metal foam filling material; and
   at least a belt coupled to the cross-link, wherein the fixing portion of the cross-link is configured to be fixed to the belt by a fixing device comprising a fastener fitted in the inner cavity, the metal foam filling material locks the fastener from rotating, blocks the fastener from becoming unfitted within the inner cavity and increases a stiffness of the section bar of the cross-link.

9. The snow groomer track of claim 8, further comprising a plurality of parallel belts and a plurality of cross-links fixed to the belts, each cross-link including a section bar which has an elongated shape, extends in the first direction, is delimited by an outer surface, comprises a fixing portion, and defines an inner cavity which extends through the section bar in the first direction and is laterally open in the first direction, wherein the inner cavity is at least partially filled with the metal foam filling material.

10. The snow groomer track of claim 8, wherein the section bar of the cross-link defines the inner cavity independent of any contoured plugs.

11. A snow groomer comprising:
a support frame;
a cabin fitted on the support frame; and
two tracks fitted on opposite sides of the support frame; each track comprising a plurality of parallel belts and a plurality of cross-links fixed to the belts, each cross-link including a section bar which has an elongated shape, extends in a first direction, is delimited by an outer surface, comprises a fixing portion configured to be fixed to at least one of the plurality of belts, and defines an inner cavity which extends through the section bar in the first direction and is laterally open in the first direction, wherein the inner cavity is at least partially filled with a metal foam filling material, the fixing portion is configured to be fixed to the at least one of the plurality of belts by a fixing device comprising a fastener fitted in the inner cavity, the metal foam filling material locks the fastener from rotating, blocks the fastener from becoming unfitted within the inner cavity and increases a stiffness of the section bar of that cross-link.

12. A method of producing a cross-link for a track of a snow groomer, the method comprising:
providing a section bar, and
forming a plurality of holes at a plurality of fixing points of the section bar;
at each of the plurality of holes, inserting a fastener in an inner cavity of the section bar;
injecting a metal foam filling material in the inner cavity to block the fasteners from becoming free within the inner cavity, to increase a stiffness of the section bar and to lock the fasteners from rotating.

13. The snow groomer of claim 11, wherein the section bar of each cross-link defines the inner cavity independent of any contoured plugs.

* * * * *